UNITED STATES PATENT OFFICE.

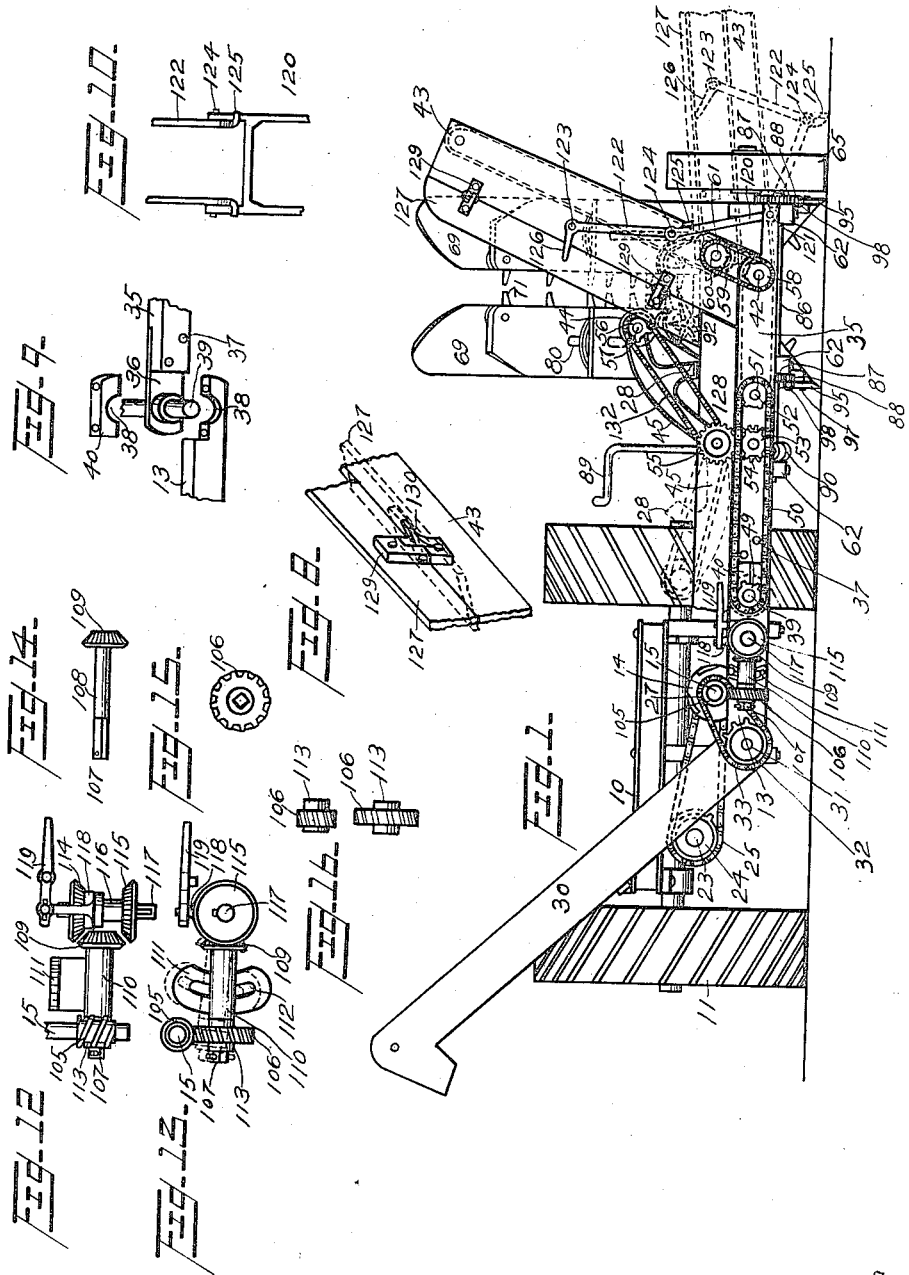

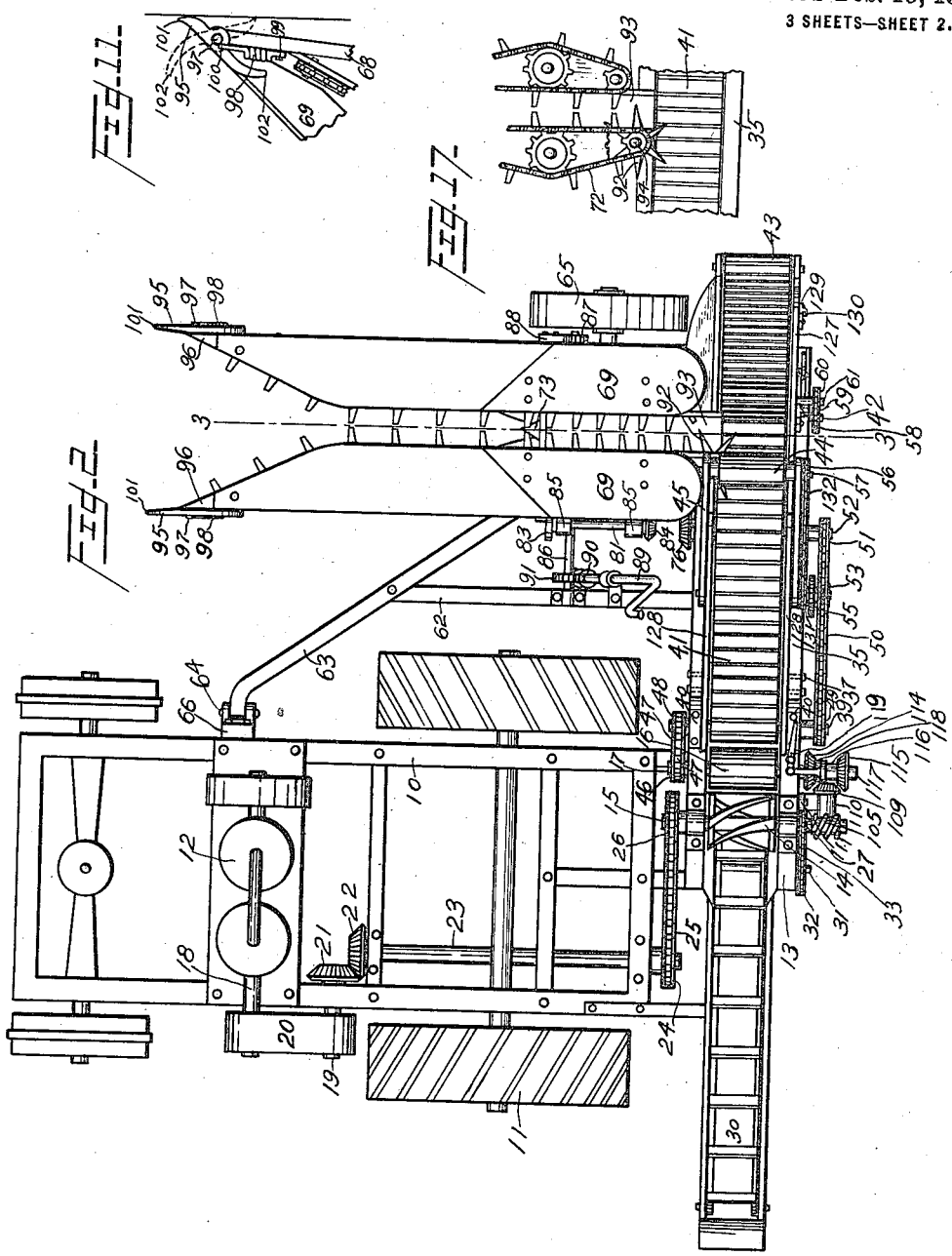

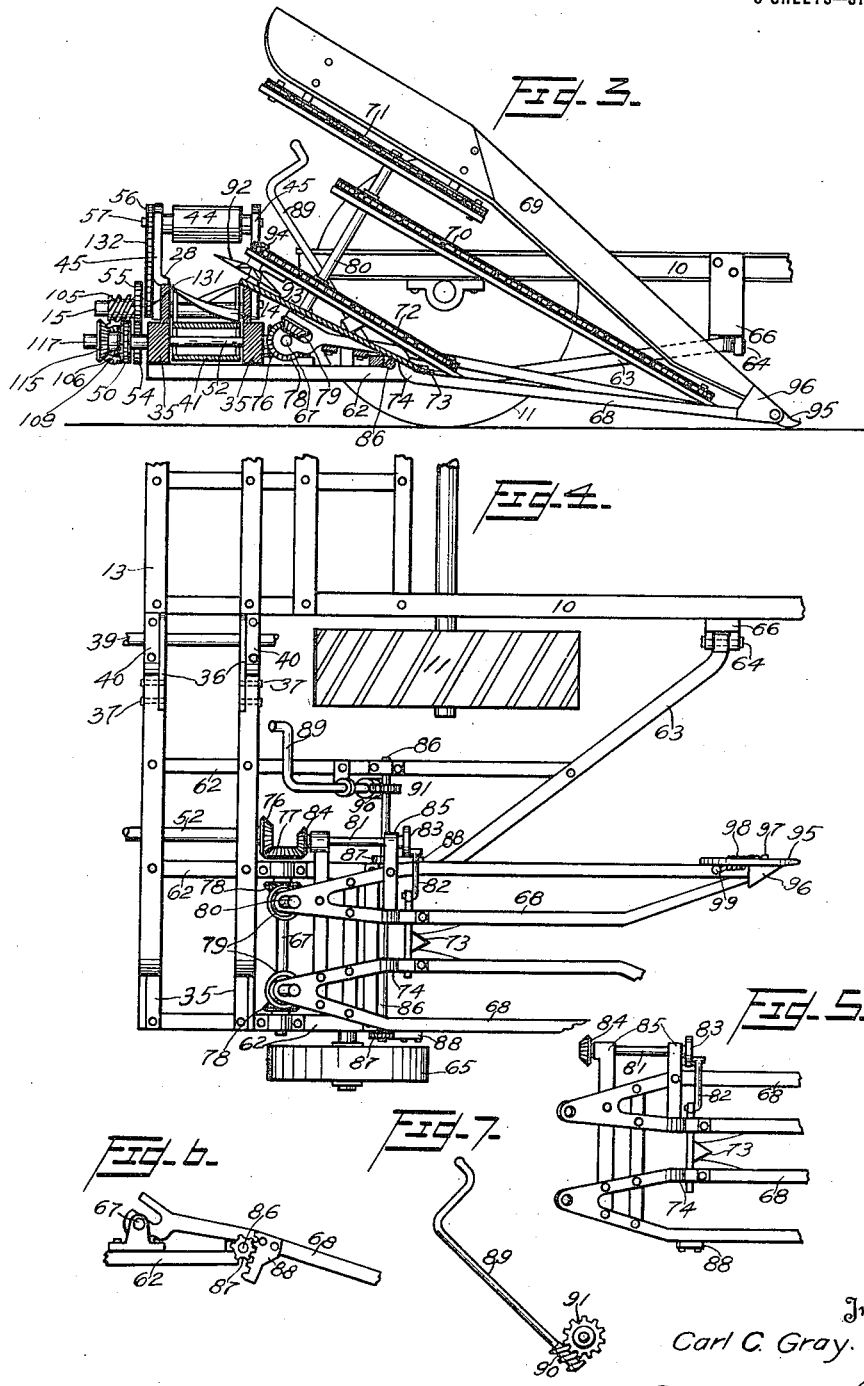

CARL C. GRAY, OF WAPAKONETA, OHIO.

ENSILAGE-HARVESTER.

1,256,683.

Specification of Letters Patent. Patented Feb. 19, 1918.

Application filed May 31, 1917. Serial No. 172,033.

*To all whom it may concern:*

Be it known that I, CARL C. GRAY, a citizen of the United States, residing at Wapakoneta, in the county of Auglaize and State of Ohio, have invented certain new and useful Improvements in Ensilage-Harvesters, of which the following is a specification.

This invention relates to an ensilage harvester and particularly to a construction adapted to cut and feed the stalks to an ensilage cutter, substantially as broadly claimed in my Patent No. 1,121,998 dated December 22, 1914, and comprises a continuation in part of my application filed October 17, 1916, Serial No. 126,147, for a similar invention.

The invention has for an object to provide an improved pivotal connection between the fixed supporting frame of the tractor or vehicle carrying the ensilage cutter and the pivotally connected frame for the harvesting mechanism carrying a conveyer belt whereby the latter is adapted to adjust itself to inequalities of the ground and at all times properly deliver the stalks to the cutter.

A further object of the invention is to provide an adjustable feed table by which material may be fed toward the conveyer belt to the ensilage cutter as delivered from the harvesting mechanism when said table is in a vertically inclined position, and also thereto independent of the harvesting mechanism when said table is in a substantially horizontal position.

The invention also provides an improved construction of adjustable swinging feed roll adapted to coöperate with the feed table when in one position or with the conveying belt when shifted.

Another object of the invention is to provide toothed means for engaging the stalk butts at their delivery from the gatherer chains by which the butts are turned toward the ensilage cutter as they are fed upon the conveyer belt.

A further object of the invention is to provide an improved gearing connection between the cutting and feeding mechanisms by which their relative speed of travel may be controlled or varied and the direction of movement of the feed roll at the ensilage cutter reversed when desired.

Other and further objects and advantages of the invention will be hereinafter set forth and the novel features thereof defined by the appended claims.

In the drawings—

Figure 1 is an end elevation of the invention;

Fig. 2 is a top plan thereof;

Fig. 3 is a section thereof, on line 3—3 of Fig. 2;

Fig. 4 is a detail plan of the harvester frame;

Fig. 5 is a detail plan of the gatherer frames;

Fig. 6 is a detail of the mounting for one of said frames;

Fig. 7 is a detail of the adjusting means for said frames;

Fig. 8 is a detail of one hinge of the side board of the feed table;

Fig. 9 is a detail perspective of the pivot for the conveyer belt frame;

Fig. 10 is a detail of the joint in the feed table brace;

Fig. 11 is a detail side elevation of the pivoted divider;

Fig. 12 is a top plan of the adjustable driving gears for the feed roll;

Fig. 13 is a side elevation of the same;

Fig. 14 is a detail of the beveled drive gear and shaft;

Fig. 15 is a detail of the changeable speed controlling worm wheel;

Fig. 16 is a detail edge view of two of these worm wheels, and

Fig. 17 is a detail plan of the butt turning wheel.

Like numerals of reference indicate like parts in the several figures of the drawings.

The numeral 10 designates the tractor or carrier frame which may be of any desired construction and provided with the usual tractor wheels 11 and any desired form of motor 12. The tractor has rigidly secured thereto at its rear a cutter frame 13 upon which the members of any preferred form of ensilage cutter are mounted. These comprise generally the cutter cylinder 14 carried by the shaft 15 mounted in the frame 13 and the feed roll 16 upon shaft 17 similarly mounted. The cutting mechanism may be of any desired character and driven by any ordinary connections, for instance the motor shaft 18 is connected to a countershaft 19 by a belt 20. The shaft 19 is provided with a bevel gear 21 meshing with a similar gear 22 on shaft 23. The latter is provided with a sprocket 24 connected by chain 25 with a sprocket 26 on cutter shaft 15.

In order to vary the length of ensilage cut and reverse the direction of movement of the feed roll thereto an adjustable driving connection is provided between the roll and the cutter shaft. It will be seen the faster the rotation of the feed roll relative to the cutter the longer will be the lengths of material cut, while a slower speed of this roll effects a shorter cut. A simple construction for this purpose is provided and comprises a worm gear 105 upon the cutter shaft 15 meshing with a worm wheel 106 removably secured upon the angular end 107 of a drive shaft 108 carrying at its opposite end a beveled gear 109. This shaft is journaled in a collar 110 carried by an adjustable slotted bracket 111 mounted upon the cutter frame. The curved slot 112 in this bracket permits its adjustment in an arc, as shown by dotted lines in Fig. 13, to compensate for the difference in size of the worm wheels 106 used to effect different relative speeds of rotation of the cutter and feed roll. As shown in Fig. 16 these changeable wheels are formed on a sleeve 113, the smaller size being located toward the end of shaft 108 and each successive larger size further inward thereon.

The beveled gear 109 is mounted to have a driving mesh with either bevel gear 114 or 115 secured at the opposite ends of a sleeve 116 suitably keyed to slide upon the end 117 of shaft 17. This shifting for the reversal of the feed roll may be effected by a connection 118 from the sleeve to pivoted lever 119 upon a fixed part.

The fixed frame 13 also supports a delivery conveyer 30 driven by shaft 31 carrying a sprocket 32 from which a chain 33 extends to a sprocket 27 on the cutter shaft 15. The harvester frame 35 is pivoted to the cutter frame 13 in any desired manner, for instance, by bearing plates 36 secured thereto at 37 and adapted to seat in pivoting sockets 38 and to receive the shaft 39. The bearing plates are secured in these sockets by removable bearing blocks 40 which permit the ready detachment of the harvester frame, conveyer belt and parts mounted thereon.

The frame 35 has mounted thereon the conveyer belt 41 which extends over and is driven by the shaft 39 at one end and by the shaft 42 at the opposite end. At the outer end of the conveyer belt an inclined feed table 43 is pivotally mounted and when in the vertical position shown in Fig. 1 is adapted to feed downward toward the belt 41, but when in the substantially horizontal dotted line position forms a feed table independent of the harvester when the latter is at rest and the parts used solely as an ensilage cutter. This table may be supported in any desired manner, such as the jointed brace formed of the lower member 120 pivoted at 121 to the harvester frame and the upper arms 122 pivoted at 123 to the table. These members are pivoted together at 124 and the arms formed with lateral stops 125 to support the parts when in vertical position, as shown in Fig. 10.

From the pivots 123 a supporting finger 126 extends at an angle to the arms 122 and is disposed to hold a side board 127 in vertical position when the table is raised. This board extends beyond the delivery from the harvesting mechanism to direct and confine the stalks between the sides 128 above the conveyer 41. The board 127 is pivoted to the table to swing outward by means of the hinges 129 one member of which is formed with a supporting stop 130. It will be seen that when the table is swung downward the finger 126 moves away from the board 127 permitting the latter to swing outward to form a side feeding surface along the table which is supported in its horizontal position by the stops 125 at the lower end of the arms 122.

Above the conveyer belt 41 a driven feed roller 44 is carried by swinging arms 45 having supporting legs 28 resting upon the sides 128 when arranged in the full line position of Fig. 1 so that the roller cooperates with the feed table and its side board to effect a contacting force feed of the stalks toward the belt and cutter. When in the dotted line position shown this feed roller is supported by its arms 45 resting upon the sides 128 and cooperates with the upper face of the conveyer belt 41 to retain stalks horizontally thereon during their feed toward the cutter. This adjustment is particularly desirable for use when feeding independent of the harvesting mechanism.

The conveying members may be driven in any preferred manner, for example, the shaft 17, which is a continuation of shaft 117, is provided with a sprocket 46 having a chain 47 extending to a sprocket 48 on shaft 39. This shaft also carries a sprocket 49 from which a chain 50 extends to a sprocket 51 on cross shaft 52. This chain also drives a sprocket 53 upon a stub-shaft carrying a gear 54 which meshes with a gear 55 upon a shaft at the pivot of the arms 45, Fig. 3. This latter shaft carries a sprocket 131 from which a chain 132 extends to a sprocket 56 on the shaft 57 of the feed roller. The feed table may be driven from the shaft 42 by the sprocket 58 thereon from which a belt 59 extends to a sprocket 60 upon the driving shaft 61 for the feed table.

The conveyer frame 35 is provided with an extension 62 for supporting the harvesting members. A tongue 63 extends from the extension 62 and is pivotally connected at 64 with the tractor 10 by a depending hanger 66, so that the harvesting and conveying members are pivotally and detachably supported at one side of the tractor. For the purpose of carrying the weight of the extension and the parts supported thereon a traction wheel 65 is provided.

The harvester frame 35 is provided with a shaft 67 upon which the depending frames 68 are pivoted for vertical adjustment as hereinafter described. These frames or arms 68 carry the parallel supporting frames 69 for the gathering chains 70, 71 and 72 and also the harvesting knives 73 operating in the space between the opposite chains. The inside members of the frames 68 have angular portions 74 (Figs. 4 and 5) which permit the location of the knives 73 at a sufficiently low level to cut the stalks so that the remaining stubs will not interfere with the passage of the harvester thereover. The general arrangement of the harvesting knives and gathering chains is shown in my prior Patent No. 1,121,998 dated December 22, 1914 and is not claimed herein.

For the purpose of driving the gathering chains the shaft 52 is provided with a bevel gear 76 meshing with a coöperating gear 77 on shaft 67. The latter shaft has beveled gears 78 meshing with gears 79 on the shafts 80 common to all of the gathering chains. The knives 73 are driven from a shaft 81 connected thereto by a pitman 82 from a crank 83 thereon and provided with a gear 84 meshing with the gear 77. The shaft 81 is supported by bearings 85 carried by the frames 68. (Figs. 4 and 5.)

The harvester frame, gathering chains and knives are adjustable vertically by means of a shaft 86 having gears 87 meshing with racks 88 on the frame members 68. (Fig. 6). This shaft 86 is rotated and held by a worm shaft 89 having a worm 90 meshing with a coöperating gear 91. (Fig. 7).

For the purpose of turning the butts of the stalks toward the ensilage cutter, a spiked or star wheel 92 is disposed adjacent the base plate 93 between the gatherers. This wheel is driven by the shaft 94 over which the gathering chain 72 passes. Fig. 3.

At the lower end of the gathering members 68 dividing points 95 are pivoted to a plate 96 as shown at 97. These points are held in the full line position shown in Fig. 11 by means of springs 98 secured to the members 68 at 99 and to the divider point at 100. In the use of the tractor it is very essential to have the divider points yield when coming into contact with a solid object upon the surface of the ground, such as roots, stones or the like. It will be noted that when the point 101 strikes such an object in the forward movement of the machine it turns under and backward bringing the end 102 forward as shown by dotted lines in Fig. 11. This forms a runner to pass over any surface object without injury to the machine, and as soon as the point 102 passes such object the spring 98 automatically returns the divider point 101 to its initial position. Both of the curved points serve as runners, as when the lower point strikes a solid object the divider plate turns on its pivot and the upper curved point turns over the object and forms a runner until after the object is passed when the spring restores the parts. In lodged corn the points must be adjusted to travel along the ground in order to pick up fallen stalks and necessarily engage stones and roots upon the surface of the ground so that the importance of this pivoted construction is obvious.

In the operation of the invention it will be seen that the corn stalks are cut by the harvester and fed backward by the gathering chains and their butts turned toward the ensilage cutter. The feed table and roller form a force feed for the stalks upon the conveyer belt with their butts in proper position to engage the cutter from which they are discharged to the delivery conveyer. This table and roller are provided with improved means for supporting them in their shifted or adjusted positions and the former has pivoted at its outer edge a side board which acts when raised to assist in controlling the feed to the conveyer and when lowered forms a side feed to the table.

The tractor has rigidly mounted thereon the ensilage cutting members while the feeding and harvesting members are pivotally connected to the tractor which permits their automatic adjustment for irregularities of the ground and simplifies the driving connection by avoiding the use of universal joints. This connection is adjustable or changeable to provide for different relative speeds of the ensilage cutter and the harvesting and feeding members thereto so that different lengths of stalk may be cut for ensilage, as hereinbefore described, and is also formed with means by which the direction of travel of the feed roll to cutter may be reversed.

The harvester is adapted to be readily attached or detached from the tractor and ensilage cutter and either of these members used independently when desired. This is facilitated by the removable bearing shown which avoids the necessity of removing the bearing shaft upon which the harvester members are pivoted. The feed roller may be used for a force feed in connection with the vertically inclined table, or disposed to coöperate with the upper face of the conveyer belt to hold the stalks in position thereon. The adjusting means for the gatherers and harvester knives presents a simple and efficient construction by which they may be adjusted and held in position so that the divider plates and other parts will be in proper relation to the ground. The adjustable feed table when vertically inclined at one side of the harvester delivery acts as a force feed when the harvester is used, and when substantially horizontal forms an independent feeding table for the conveyer leading to the ensilage cutter.

The term "tractor" as used herein is intended to cover any form of vehicle which may support or transmit power for driving the operative parts hereinbefore described. Any desired construction of harvester, conveyers, and ensilage cutter may be used, as the invention herein relates to the novel construction of the connections between these parts, their adjustment, specific construction and operative combination.

What I claim is:—

1. In an ensilage harvester, a tractor, a cutter frame rigidly secured thereto, an ensilage cutter supported upon said frame, a harvester frame freely pivoted to said cutter frame to adjust itself to uneven surfaces of the ground, a conveying belt upon said harvester frame in alinement with said cutter and delivering thereto at the pivot between said frames during the pivotal movement of the harvester frame relative to said cutter, and harvesting means upon the harvester frame constructed to deliver stalks upon said belt.

2. In an ensilage harvester, a tractor, a cutter frame rigidly secured thereto, an ensilage cutter supported upon said frame, a harvester frame freely pivoted to said cutter frame, a conveying belt upon said harvester frame delivering to the ensilage cutter and movable upon said pivot in the pivotal movement of the harvester frame, harvesting means upon said harvester frame, means for delivering material therefrom to said belt, and a feed table disposed at one end of said belt adjacent said delivery means and inclined from the vertical.

3. In an ensilage harvester, a tractor, a cutter frame rigidly secured thereto, an ensilage cutter supported upon said frame, a harvester frame freely pivoted to said cutter frame, a conveying belt upon said harvester frame delivering to the ensilage cutter and movable upon said pivot in the pivotal movement of the harvester frame, harvesting means upon said harvester frame, means for delivering material therefrom to said belt, a feed table disposed at one end of said belt adjacent said delivery means and inclined from the vertical, and a driven feed roller carried by pivoted arms and coöperating with said feed table to effect a force feed.

4. In an ensilage harvester, a tractor, an ensilage cutter supported thereon, a harvester frame connected to said tractor, a conveying belt upon said frame delivering to said ensilage cutter, harvesting mechanism carried by said frame and having means for feeding stalks to said belt, an inclined feed table at one end of said belt, and a driven feed roller mounted upon pivoted arms and shiftable to coöperate with the upper face of said belt or said feed table.

5. In an ensilage harvester, a tractor, an ensilage cutter supported thereon, a harvester frame connected to said tractor, a conveying belt upon said frame delivering to said ensilage cutter, harvesting mechanism carried by said frame and having means for feeding stalks to said belt, and a feed table disposed at the end of said belt where stalks are delivered thereto from said feeding means and movable from a position inclined from the vertical, for receiving from said feeding means, to a substantially horizontal position to feed directly to said belt independent of the harvesting mechanism.

6. In an ensilage harvester, a tractor, a cutter frame secured thereto, an ensilage cutter supported upon said frame, a harvester frame connected to said cutter frame and provided with a conveying belt delivering to said ensilage cutter, harvesting cutters, gathering means coöperating therewith and delivering to said belt, and means independent of the gathering means and belt for forcibly engaging and turning the stalk butts toward the ensilage cutter as they are delivered to said belt.

7. In an ensilage harvester, a tractor, a cutter frame secured thereon, an ensilage cutter supported upon said frame, a harvester frame connected to said cutter frame and provided with a conveying belt delivering to said ensilage cutter, harvesting cutters, gathering means coöperating therewith and delivering to said belt, and a toothed wheel disposed at the delivery end of said gatherers for forcibly turning the stalk butts toward the ensilage cutter as they are delivered to said belt.

8. In an ensilage harvester, a tractor, an ensilage cutter supported thereby, a harvester frame connected to said tractor and provided with a conveying belt delivering to said cutter, harvesting means upon said frame, means for delivering stalks to said belt from said harvesting means, a traveling feed table inclined from the vertical and disposed at one end of said belt adjacent the stalk delivery thereto and shiftable into a substantially vertical or substantially horizontal position, and a driven feed roller shiftable for coöperation with said table in its inclined position or with said belt when the harvesting means is at rest.

9. In an ensilage harvester, a tractor, a cutter frame secured thereto, an ensilage cutter supported upon said frame, a harvester frame connected to said cutter frame and provided with a conveying belt delivering to said ensilage cutter, harvesting cutters and means for delivering material therefrom to said belt, a toothed wheel disposed at the delivery from said means to turn the stalk butts toward the ensilage cutter, a traveling feed table at one end of said belt inclined from the vertical, a driven feed roller coöperating with said table to engage said stalks, and a delivery conveyer from said ensilage cutter.

10. In an ensilage harvester, a tractor, an ensilage cutter mounted thereon, a harvester frame connected to said tractor, a conveying belt thereon delivering to said ensilage cutter, parallel frames pivoted upon said harvester frame for supporting harvesting cutters and means delivering therefrom to said belt, a fixed shaft provided with pinions thereon, racks on said parallel frames meshing with said pinions, a worm gear on said shaft, and an operating shaft having a worm coöperating with said gear.

11. In an ensilage harvester, a tractor, an ensilage cutter mounted thereon, a harvester frame connected to said tractor, a conveying belt thereon delivering to said ensilage cutter, parallel frames pivoted upon said harvester frame and having angular portions intermediate their ends, a harvesting cutter mounted at the lower part of said portions, and means for vertically adjusting said parallel frames.

12. In an ensilage harvester, a tractor, an ensilage cutter mounted thereon, a motor on said tractor having a connection for driving the cutter, a harvesting frame freely pivoted to the frame of said cutter adjacent thereto for movement upon its pivot relative to the cutter, a conveying belt mounted upon said frame in alinement with and disposed to deliver to said ensilage cutter, a driving shaft for said belt disposed at the pivotal connection of the harvester frame and having a driving connection with the shaft of said cutter, and a harvesting mechanism constructed to deliver stalks to said belt.

13. In an ensilage harvester, a tractor, an ensilage cutter mounted thereon, a motor on said tractor having a connection for driving the cutter, a feed roller for said cutter having a driving connection therewith, a harvester frame pivoted to the frame of said cutter, a conveying belt mounted upon the frame of said harvester to deliver to said ensilage cutter, a driving shaft for said belt having a connection with the shaft of said feed roller, a harvesting mechanism upon said harvester frame, a cross shaft having a connection from the belt driving shaft for said mechanism, a shiftable feed table, and a connection from said belt arranged to drive said table toward the belt.

14. In an ensilage harvester, a tractor, an ensilage cutter mounted thereon, a motor on said tractor having a connection for driving the cutter, a feed roller for said cutter having a driving connection therewith, a harvester frame pivoted to the frame of said cutter, a conveying belt mounted upon said frame of the harvester to deliver to said ensilage cutter, a driving shaft for said belt having a connection with the shaft of said feed roller, a harvesting mechanism upon said frame, a cross shaft having a connection from the belt driving shaft for said mechanism, a rotatable feed roller mounted above said belt and driven by a connection therefrom, a shiftable feed table, and a connection from said belt arranged to drive the table toward the belt.

15. In an ensilage harvester, frames mounted thereon and provided with opposite gathering means, coöperating harvesting means, a divider plate pivoted intermediate its ends at the lower end of one of said frames and having a plurality of runner surfaces, and a spring for normally retaining said plate in one position.

16. In an ensilage harvester, frames mounted thereon and provided with opposite parallel gathering chains, a harvesting cutter intermediate thereof, and divider plates pivoted at a point intermediate their ends and shaped so that either end of said plates may act as a runner.

17. In an ensilage harvester, frames mounted thereon and provided with opposite gathering means, coöperating harvesting means, a divider plate pivoted intermediate its ends at the lower end of one of said frames and having oppositely curved ends providing a plurality of runner faces, and a spring connecting said plate and frame for yieldingly retaining the former in one position.

18. In an ensilage harvester, an ensilage cutter, a conveying belt for feeding thereto, a harvesting mechanism delivering to said belt, a feed table disposed at the harvester delivery and shiftable from a vertically inclined to a horizontal position, and a pivoted side board at the outer side edge of said table.

19. In an ensilage harvester, an ensilage cutter, a conveying belt for feeding thereto, a harvesting mechanism delivering to said belt, a feed table disposed adjacent the harvester delivery and shiftable from a vertically inclined to a horizontal position, a pivoted side board at the outer edge of said table, and a shiftable feed roller disposed to coöperate with said table and board when inclined or with said belt when the table is horizontal.

20. In an ensilage harvester, an ensilage cutter, a conveying belt for feed thereto, a harvesting mechanism delivering to said belt, a feed table disposed adjacent the harvester delivery and shiftable from a vertically inclined position to a horizontal position, a pivoted side board at the outer edge of said table, and means to support said table arranged to retain or release said side board.

21. In an ensilage harvester, an ensilage cutter, a conveying belt for feeding thereto, a harvesting mechanism delivering to said belt, a feed table disposed adjacent the harvester delivery and shiftable from a vertically inclined position to a horizontal position, a pivoted side board at the outer edge of said table, and a jointed brace pivoted to said table and the harvester frame and arranged to support the table in either position.

22. In an ensilage harvester, an ensilage cutter, a conveying belt for feeding thereto, a harvesting mechanism delivering to said belt, a feed table disposed adjacent the harvester delivery and shiftable from a vertically inclined position to a horizontal position, a pivoted side board at the outer edge of said table, a jointed brace arranged to support the table in either position, and an arm from the pivot of said brace upon the table to engage said board when the table is inclined.

23. In an ensilage harvester, an ensilage cutter, a conveying belt for feeding thereto, a harvesting mechanism delivering to said belt, a feed table disposed adjacent the harvester delivery and shiftable from a vertically inclined position to a horizontal position, a pivoted side board at the outer edge of said table, a brace disposed to support said table in either position comprising two members pivoted together and to the table and harvester frame, and a stop carried by one member at their pivot together and disposed to engage the other member adjacent the point of its pivotal connection with the other member, and disposed to engage the latter.

24. In an ensilage harvester, an ensilage cutter, a conveying belt for feeding thereto, a harvesting mechanism delivering to said belt, a feed table disposed adjacent the harvester delivery and shiftable from a vertically inclined position to a horizontal position, a pivoted side board at the outer edge of said table arranged to swing outward to form a feeding surface, a brace to support said table in either position comprising two members pivoted together and to the table and harvester frame, and an angle arm carried by the brace at its table pivot and disposed to engage said board when the table is inclined.

25. In an ensilage harvester, an ensilage cutter, a conveying belt for feeding thereto, a harvesting mechanism delivering to said belt, a feed roller carried by pivoted arms and disposed above said belt, an inclined feed table adjacent the harvester delivery, and means upon said arms to rest upon the sides of the belt frame when the roller is in position adjacent the feed table.

26. In an ensilage harvester, an ensilage cutter, a conveying belt for feeding thereto, a harvesting mechanism delivering to said belt, a shiftable feed roller carried by pivoted arms above said belt, an inclined feed table adjacent the harvester delivery, means for supporting said roller in position adjacent the feed table, driving means for said belt, and a geared connection therefrom to rotate said roller in either of its shifted positions.

27. In an ensilage harvester, an ensilage cutter, a conveying belt for feeding thereto, a harvesting mechanism delivering to said belt, means independent of the belt for turning stalk butts toward said cutter as delivered to said belt, and an inclined driven feed table disposed at the receiving end of said belt to feed stalk tops thereto.

28. In an ensilage harvester, an ensilage cutter, a conveying belt for feeding thereto, a harvesting mechanism delivering to said belt, means independent of the belt for turning stalk butts toward said cutter as so delivered, an inclined driven feed table at the receiving end of said belt, and a driven feed roller disposed opposite said table and at one side of said delivery.

29. In an ensilage harvester, an ensilage cutter, a conveying belt for feeding thereto, a harvesting mechanism delivering to said belt, means for turning stalk butts toward said cutter as so delivered, an inclined driven feed table at the receiving end of said belt. a driven feed roller disposed opposite said table and at one side of said delivery, means for shifting said roller to coöperate with said belt, and means for shifting said table into a horizontal position.

In testimony whereof I affix my signature in the presence of two witnesses.

CARL C. GRAY.

Witnesses:
J. BURTON WELLS,
E. B. SPROUL.